(12) United States Patent
Georgeson et al.

(10) Patent No.: US 10,352,777 B2
(45) Date of Patent: Jul. 16, 2019

(54) SYSTEMS AND METHODS FOR MONITORING TEMPERATURES OF BATTERIES

(71) Applicant: THE BOEING COMPANY, Huntington Beach, CA (US)

(72) Inventors: Gary E. Georgeson, Tacoma, WA (US); Morteza Safai, Newcastle, WA (US)

(73) Assignee: The Boeing Company, Chicago, IL (US)

(*) Notice: Subject to any disclaimer, the term of this patent is extended or adjusted under 35 U.S.C. 154(b) by 318 days.

(21) Appl. No.: 14/591,310

(22) Filed: Jan. 7, 2015

(65) Prior Publication Data
US 2016/0195437 A1    Jul. 7, 2016

(51) Int. Cl.
| G01K 11/12 | (2006.01) |
| H01M 10/48 | (2006.01) |
| H01M 10/052 | (2010.01) |

(52) U.S. Cl.
CPC ........... *G01K 11/12* (2013.01); *G01K 11/125* (2013.01); *H01M 10/486* (2013.01); *H01M 10/488* (2013.01); *G01K 2205/00* (2013.01); *H01M 10/052* (2013.01); *H01M 2200/00* (2013.01); *H01M 2200/10* (2013.01); *H01M 2220/20* (2013.01); *Y02E 60/122* (2013.01)

(58) Field of Classification Search
CPC .. G01K 11/12; G01K 11/125; G01K 2205/00; H10M 10/486; H10M 10/052; H01M 2220/20; H01M 2200/00; H01M 2200/10; H01M 10/486; H01M 10/052; H01M 10/488

USPC ....... 374/152, 162, 161; 701/34.4; 29/623.1, 29/623.5
See application file for complete search history.

(56) References Cited

U.S. PATENT DOCUMENTS

| 2,666,583 A | 1/1954 | Whitney |
| 3,744,295 A | 7/1973 | Allinikov |
| 4,072,055 A * | 2/1978 | Elliott ............. G01K 11/06 374/159 |
| 4,092,586 A * | 5/1978 | Dinkler ............ G01K 15/00 324/203 |
| 4,105,583 A | 8/1978 | Glover et al. |

(Continued)

FOREIGN PATENT DOCUMENTS

| DE | 102012203655 A1 | 9/2013 | |
| WO | WO 2006127569 A2 * | 11/2006 | ........... C08L 75/04 |

OTHER PUBLICATIONS

English Translation of DE102012203655.*
(Continued)

*Primary Examiner* — Jonathan M Dunlap
(74) *Attorney, Agent, or Firm* — Joseph M. Butscher; The Small Patent Law Group, LLC

(57) ABSTRACT

A method for monitoring a temperature of a battery is provided. The method includes applying a thermochromatic coating to a surface of the battery. The method additionally includes directing electromagnetic radiation towards the thermochromatic coating, observing a thermochromatic response of the thermochromatic coating to the electromagnetic radiation, and identifying at least one portion of the battery that has experienced a temperature above a predefined threshold temperature, based on the thermochromatic response.

26 Claims, 10 Drawing Sheets

(56) References Cited

U.S. PATENT DOCUMENTS

| | | | | |
|---|---|---|---|---|
| 4,137,769 A * | 2/1979 | Parker | ............... | G01K 3/04 116/217 |
| 4,215,275 A * | 7/1980 | Wickersheim | ............ | G01J 5/48 356/44 |
| 4,232,552 A * | 11/1980 | Hof | ................ | G01K 11/06 116/201 |
| 4,339,951 A * | 7/1982 | Yee | ................ | C08F 38/00 116/202 |
| 4,437,772 A * | 3/1984 | Samulski | ............ | G01K 1/024 250/340 |
| 4,448,547 A * | 5/1984 | Wickersheim | ............ | G01J 5/48 250/337 |
| 4,652,143 A * | 3/1987 | Wickersheim | ..... | G01K 11/3213 250/458.1 |
| 4,805,188 A * | 2/1989 | Parker | ............... | G01K 1/14 374/141 |
| 4,863,282 A * | 9/1989 | Rickson | ............ | G01J 1/50 250/372 |
| 4,895,156 A * | 1/1990 | Schulze | ............ | A61B 5/1459 250/458.1 |
| 5,053,339 A * | 10/1991 | Patel | ................ | G01K 3/04 116/206 |
| 6,171,524 B1 | 1/2001 | Kubichan | | |
| 6,214,623 B1 * | 4/2001 | Simons | ............ | G01K 3/04 116/207 |
| 6,366,403 B1 | 4/2002 | Kurtz et al. | | |
| 6,466,299 B1 | 10/2002 | Lehtiniemi et al. | | |
| 6,483,275 B1 * | 11/2002 | Nebrigic | ............ | G01R 31/3648 320/107 |
| 6,682,121 B1 * | 1/2004 | Conforti | ............ | B60J 11/08 160/370.21 |
| 7,278,369 B2 | 10/2007 | Kelley et al. | | |
| 8,002,851 B2 | 8/2011 | Fyvie et al. | | |
| 8,671,871 B2 * | 3/2014 | Huffman | ............ | G01K 3/04 116/207 |
| 9,183,725 B2 * | 11/2015 | Schumann | ............ | G08B 21/182 |
| 9,267,993 B2 * | 2/2016 | Farmer | ............ | G01N 25/20 |
| 2003/0067465 A1 | 4/2003 | Jelinek et al. | | |
| 2006/0008699 A1 | 1/2006 | Um | | |
| 2007/0158624 A1 * | 7/2007 | Weder | ............ | C09K 9/02 252/582 |
| 2010/0247900 A1 | 9/2010 | Parker et al. | | |
| 2011/0100545 A1 | 5/2011 | Krattiger | | |
| 2011/0123712 A1 | 5/2011 | Becker, IV et al. | | |
| 2012/0079981 A1 * | 4/2012 | Huffman | ............ | G01K 3/04 116/207 |
| 2012/0205386 A1 | 8/2012 | Owen et al. | | |
| 2013/0273406 A1 * | 10/2013 | Ihara | ............ | H01M 10/0525 429/144 |
| 2014/0044609 A1 | 2/2014 | Prusik et al. | | |
| 2014/0085094 A1 * | 3/2014 | Schumann | ............ | G08B 21/182 340/636.1 |
| 2014/0273240 A1 | 9/2014 | Georgeson et al. | | |
| 2014/0328369 A1 * | 11/2014 | Flinn | ............ | G01N 33/442 374/57 |
| 2015/0367733 A1 * | 12/2015 | Peel | ............ | G01R 31/3682 320/109 |
| 2016/0011270 A1 * | 1/2016 | Poirier | ............ | G01K 11/12 324/426 |
| 2016/0025662 A1 * | 1/2016 | Georgeson | ............ | G01N 25/72 374/4 |
| 2016/0195470 A1 * | 7/2016 | Safai | ............ | G01J 5/28 250/206 |
| 2016/0315361 A1 * | 10/2016 | Petzinger | ............ | H01M 2/1077 |
| 2018/0038792 A1 * | 2/2018 | Toivola | ............ | B64F 5/60 |

OTHER PUBLICATIONS

Extended European Search Report for Application No. 15193661.4, dated Jan. 29, 2016, 8 pages.
EPO Examination Report for related application 15193661.4 dated Aug. 10, 2017; 4 pp.
EP Examination Report for related application 15193661.4 dated Apr. 24, 2018, 4 pp.

* cited by examiner

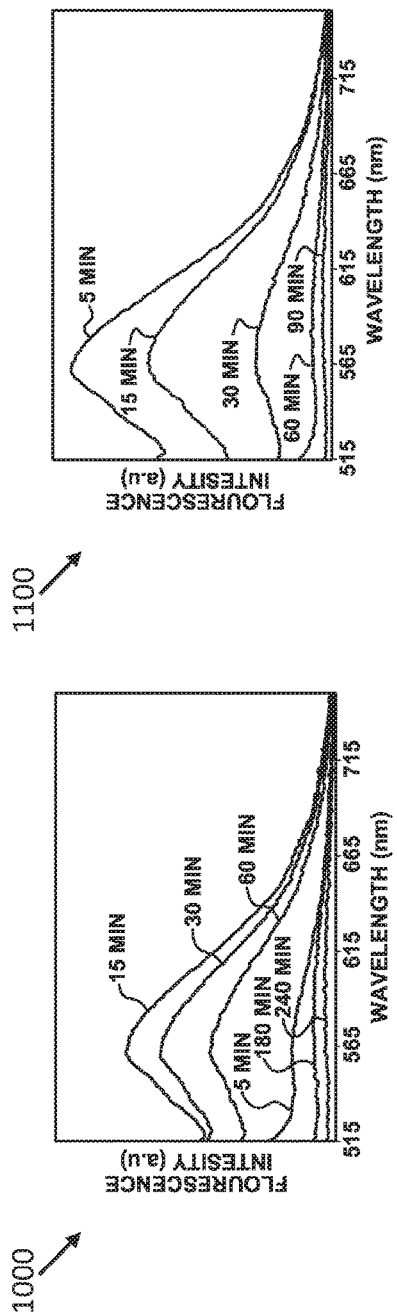

SYSTEMS AND METHODS FOR MONITORING TEMPERATURES OF BATTERIES

BACKGROUND

The present disclosure relates generally to monitoring temperatures of objects, and more specifically to monitoring temperatures of battery components.

In at least some known systems, a thermocouple monitors a temperature of a portion of a battery and transmits a signal indicating the temperature to an output device. The thermocouple is only capable of measuring the temperature at a particular portion of the battery, rather than measuring temperatures across an entire surface of the battery. In other known systems, a battery must be disassembled to investigate whether any portions of the battery have exceeded a predefined threshold temperature. It would be beneficial to have a system that provides a direct and clear indicator of the locations, extents, and levels of heating that have occurred in the past as well as the present for the entire surface of a battery.

BRIEF DESCRIPTION

In one aspect, a method for monitoring a temperature of a battery is provided. The method includes applying a thermochromatic coating to a surface of the battery. The method additionally includes directing electromagnetic radiation towards the thermochromatic coating, observing a thermochromatic response of the thermochromatic coating to the electromagnetic radiation, and identifying at least one portion of the battery that has experienced a temperature above a predefined threshold temperature, based on the thermochromatic response.

In another aspect, a system for use in monitoring temperatures experienced by a battery is provided. The system includes a battery including at least one cell. The system additionally includes a container containing the battery. Additionally, the system includes a thermochromatic coating applied to at least one of the battery, the at least one cell, and the container. The thermochromatic coating includes a plurality of probes that, when exposed to a predefined frequency range of electromagnetic radiation, emit a thermochromatic response that indicates a temperature that each respective probe reached during a predefined time period.

In another aspect, a system for monitoring temperatures experienced by a battery is provided. The system includes a monitoring computing device including a processor. The monitoring computing device is configured to receive one or more images of a thermochromatic coating of at least one of a battery container, a battery, and a battery cell, wherein the thermochromatic coating is emitting a thermochromatic response. The monitoring computing device is additionally configured to identify, in the one or more images, at least one of a color and an intensity of a portion of the thermochromatic coating, and determine, from the at least one of the color and the intensity, that the portion experienced a temperature above a predefined threshold temperature.

BRIEF DESCRIPTION OF THE DRAWINGS

FIG. 10 is a first chart of response curves of a thermochromatic coating including the first type of probe.

FIG. 11 is a second chart of response curves of the thermochromatic coating including the first type of probe.

FIG. 12 is a third chart of response curves of the thermochromatic coating including the first type of probe.

DETAILED DESCRIPTION

Implementations of the systems described herein include thermochromatic probes that are included in a thermochromatic coating to provide a thermal witness area that accurately and precisely monitor temperatures anywhere on the surface of an object, such as a battery, a battery container, or a battery cell to which the coating is applied. The thermochromatic coating is able to map temperatures across a surface from previous or current thermal events. The thermochromatic coating has a time-temperature indicator (TTI) capability as well. The thermochromatic coating is interrogated using a sensor light, such as an ultraviolet light, to fluoresce the coating and visualize the thermal history of every part of the battery, battery container, or battery cells. The methods and systems described herein may be used with in-service batteries, as well as in the manufacture and pre- or post-delivery testing of batteries.

In one implementation, a computer program is provided, and the program is embodied on a computer-readable medium. In an example implementation, the computer program is executed on a single computing device, without requiring a connection to a server computer. The computer program is flexible and designed to run in various different environments without compromising any major functionality. In some implementations, the system includes multiple components distributed among a plurality of computing devices. One or more components may be in the form of computer-executable instructions embodied in a computer-readable medium. The systems and processes are not limited to the specific implementations described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
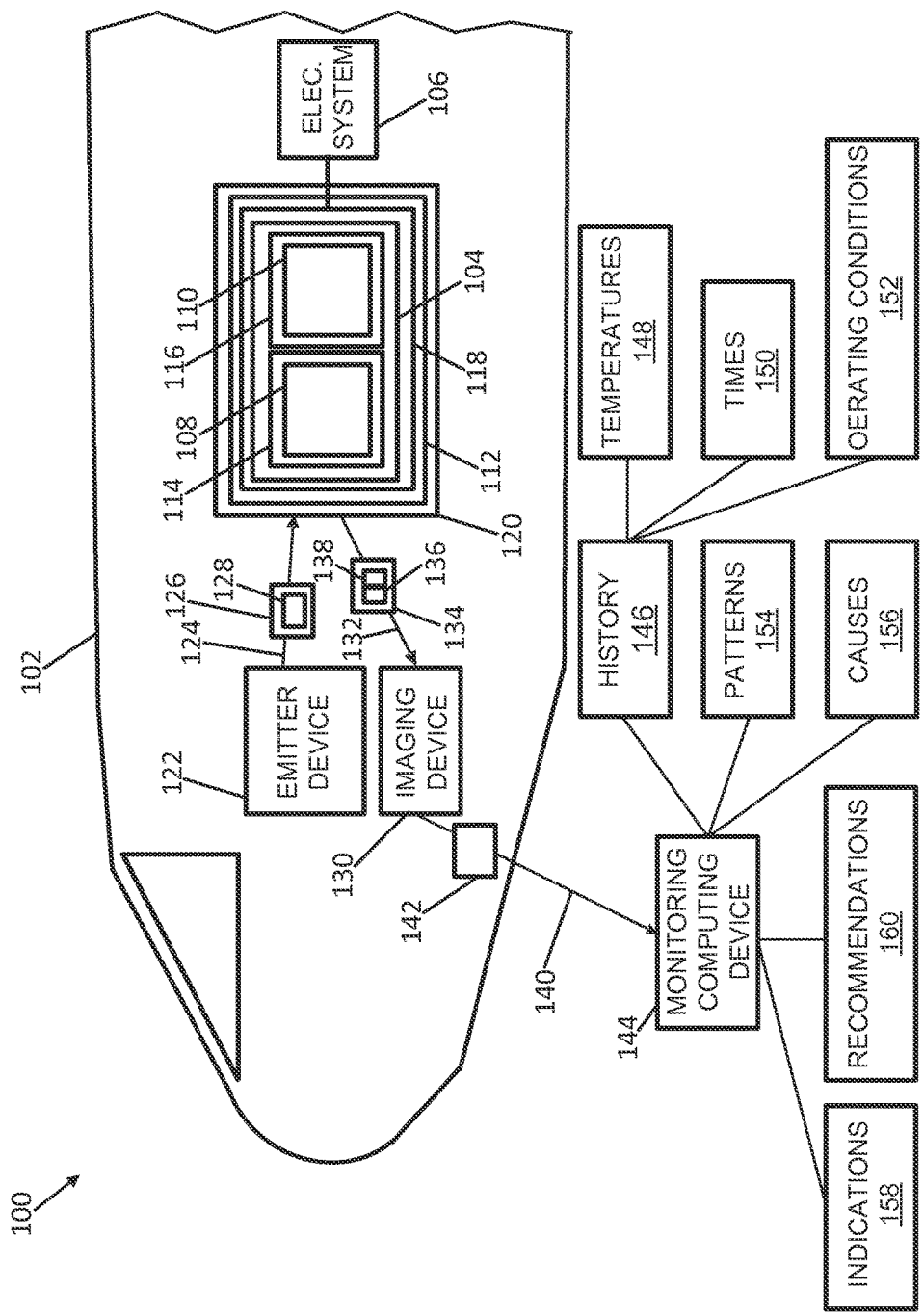
FIG. 1 is a diagram of an example environment in which temperatures of a battery are monitored.

FIG. 1 is a diagram of an environment 100 in which temperatures of a battery 104 are monitored. Battery 104 is installed in a vehicle 102, such as an aircraft and is coupled to an electrical system 106. Battery 104, which is, for example, a lithium ion battery, includes a plurality of cells, including a first cell 108 and a second cell 110. In at least some implementations, battery 104 is contained within a container 112. First cell 108 is coated with a first thermochromatic coating 114. Second cell 110 is coated with a second thermochromatic coating 116. Battery 104 is coated with a third thermochromatic coating 118, and container 112 is coated with a fourth thermochromatic coating 120. Each thermochromatic coating 114, 116, 118, and 120 is configured to fluoresce with colors and intensities that represent temperatures experienced along the surfaces of thermochromatic coatings 114, 116, 118, and 120 within a predefined time period (e.g., the last 4 hours). In particular, each thermochromatic coating 114, 116, 118, and 120 fluoresces in response to being exposed to a particular frequency or frequency range of electromagnetic radiation. In some implementations, the electromagnetic radiation is in the ultraviolet light frequency range (e.g., wavelengths of 400 nm to 10 nm).

Each thermochromatic coating 114, 116, 118, and 120 is, for example, a composite that includes a matrix and one or more types of probes. In at least some implementations, one type of probe activates (e.g., fluoresces) after exceeding a baseline temperature of, for example 200 degrees Celsius. Other types of probes have different baseline temperatures that, when exceeded, cause the probes to activate. The matrix is any material capable of supporting the probes without adversely affecting the fluorescing properties of the probes. In some implementations, the matrix is one or more of a thermoset polymer, a thermoplastic polymer, and a sol-gel. In some implementations, the matrix is a polymer of the types used to form carbon-fiber reinforced plastic composite.

Figure 8:
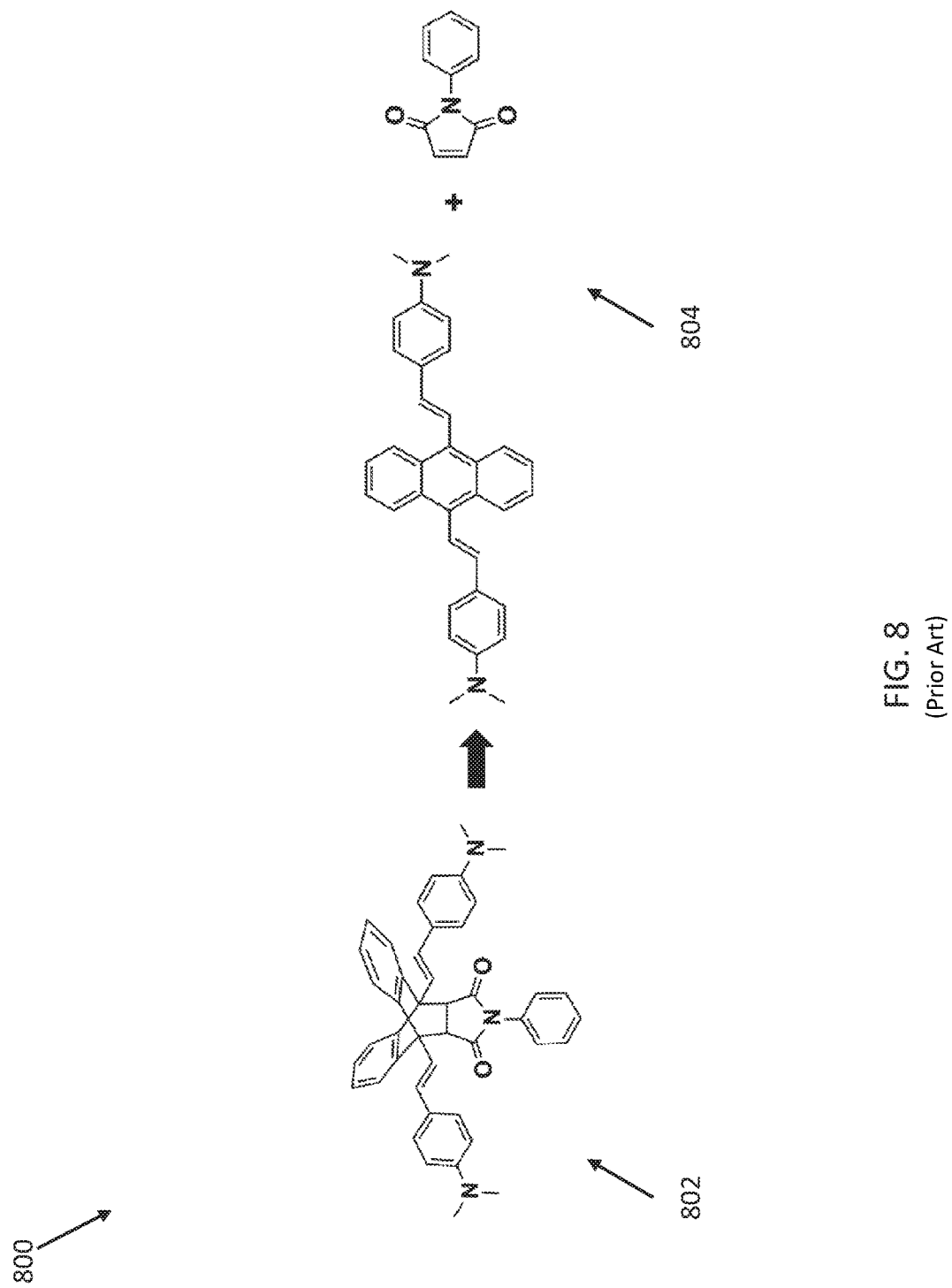
FIG. 8 is a diagram of a relationship between a first state and a second state of a first type of probe.
Figure 9:
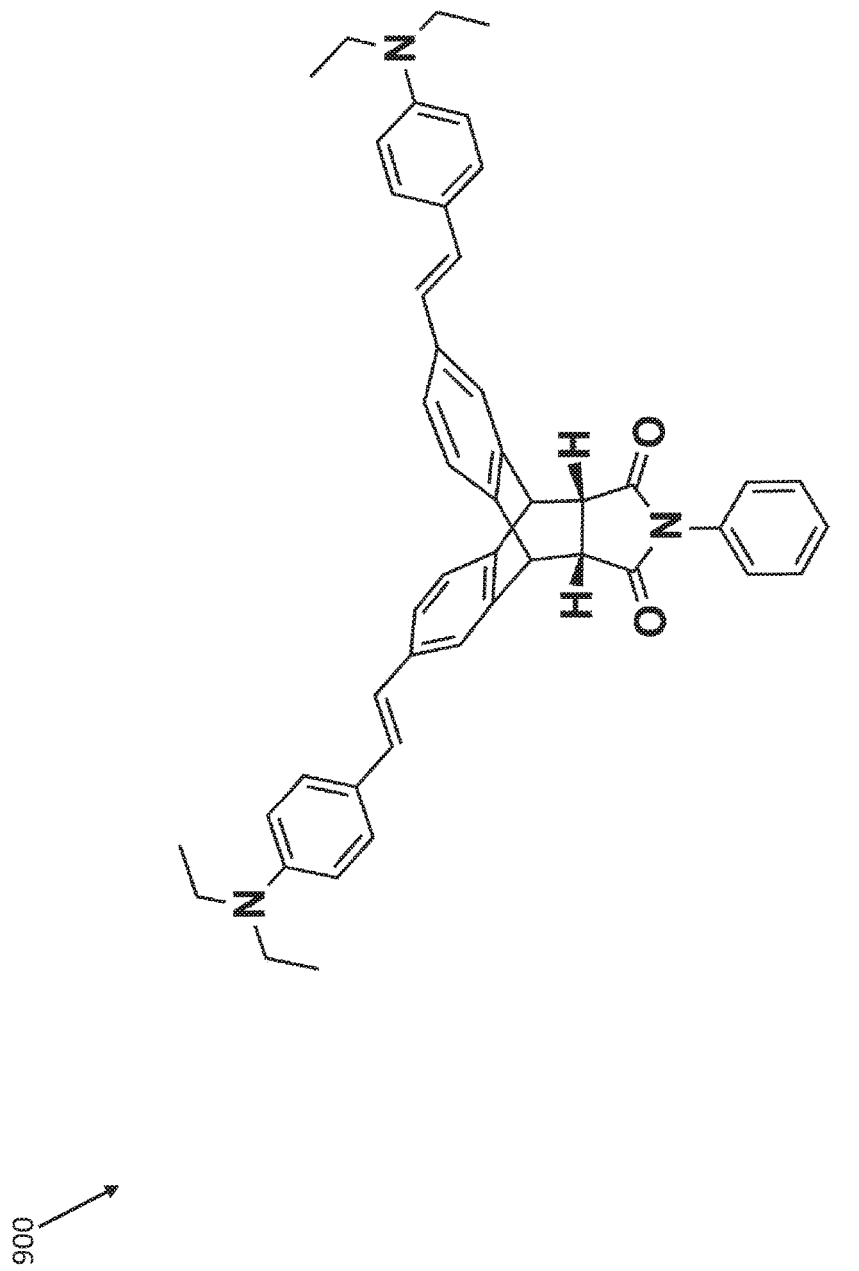
FIG. 9 is a diagram of a molecular structure of a second type of probe.

The polymer matrix materials include, for example, classes of two-part epoxy resins, such as Hysol EA 9390, Araldite MY 720/Aradur 876, or Toray 3900 with various amine based curing agents (e.g. 2,2'-Dimethyl-4,4'methylenebis(cyclohexylamine)). The probes are incorporated within the matrix. For example, the probes are mixed into a liquid form of the thermochromatic coating or applied to a surface of the matrix. Thermal activation of fluorescence in the probes occurs when an adduct moiety is removed, causing the probe to transition from a non-fluorescent state to a fluorescent state. FIG. 8 is a relationship 800 between a first molecular structure 802 of a first type of probe known as AJNDE16 prior to experiencing a temperature beyond a baseline temperature (e.g., greater than 200 degrees Celsius) and a second molecular structure 804 after the probe has experienced temperatures beyond the baseline temperature and, therefore, has been activated. FIG. 9 shows a molecular structure 900 of a second type of probe known as AJNDE35 that has a different baseline temperature and different responses (i.e., colors and intensities at different temperatures) than the first type of probe (i.e., AJNDE16).

FIG. 10 is a chart 1000 of response curves (i.e., fluorescence intensity versus wavelength (color)) of a thermochromatic coating (e.g., one or more of first coating 114, second coating 116, third coating 118, and fourth coating 120) including AJNDE16 probes, when subjected to a temperature of 204 degrees Celsius for different amounts of time. FIG. 11 is a chart 1100 of response curves of a thermochromatic coating (e.g., one or more of first coating 114, second coating 116, third coating 118, and fourth coating 120) including AJNDE16 probes, when subjected to a temperature of 232 degrees Celsius for different amounts of time. FIG. 12 is a chart 1200 of response curves of a thermochromatic coating (e.g., one or more of first coating 114, second coating 116, third coating 118, and fourth coating 120) including AJNDE16 probes, when subjected to a temperature of 260 degrees Celsius for different amounts of time. More specifically, the response curves in FIGS. 10 through 12 represent colors and intensities emitted (thermochromatic responses) by one or more thermochromatic coatings coating (e.g., one or more of first coating 114, second coating 116, third coating 118, and fourth coating 120) that include AJNDE16 probes when subjected to 470 nm electromagnetic radiation.

An emitter device 122 emits an activation signal 124 that includes electromagnetic radiation 126 (e.g., light) at a predefined frequency 128 (e.g., an ultraviolet light frequency) towards thermochromatic coatings 114, 116, 118, and 120. Thermochromatic coatings 114, 116, 118, and 120 emit a response signal 132 to an imaging device 130 (e.g., a digital camera). Response signal 132 includes a thermochromatic response 134, including colors 136 and intensities 138 (e.g., candela) emitted by thermochromatic coatings 114, 116, 118, and 120 indicative of temperatures experienced by thermochromatic coatings 114, 116, 118, and 120 within a predefined time period (e.g., 4 hours).

Imaging device 130 transmits an output signal 140 including one or more images 142 of the thermochromatic response 134 to monitoring computing device 144. More specifically, over time, imaging device 130 transmits images 142 of different thermochromatic responses 134 imaged at different times and dates to monitoring computing device 144. Monitoring computing device 144 generates a history 146 that includes temperatures 148 indicated in thermochromatic responses 134, times 150 that the images 142 were captured, and operating conditions 152 of vehicle 102. The operating conditions 152 may be manually entered by a user of monitoring computing device 144 and/or retrieved from one or more components of vehicle 102, such as electrical system 106. Monitoring computing device 144 additionally detects one or more patterns 154 in temperatures indicated by thermochromatic responses 134 and, in at least some implementations, correlates history 146 with patterns 154 to facilitate determining causes 156 of heating in battery 104. Additionally, monitoring computing device 144 outputs visual indications 158 of temperatures reached on various portions of battery cells 108 and 110, battery 104, and container 112, and generates one or more recommendations 160, such as replacing or performing further monitoring of one or more cells (e.g., first cell 108 and second cell 110).

Figure 2:
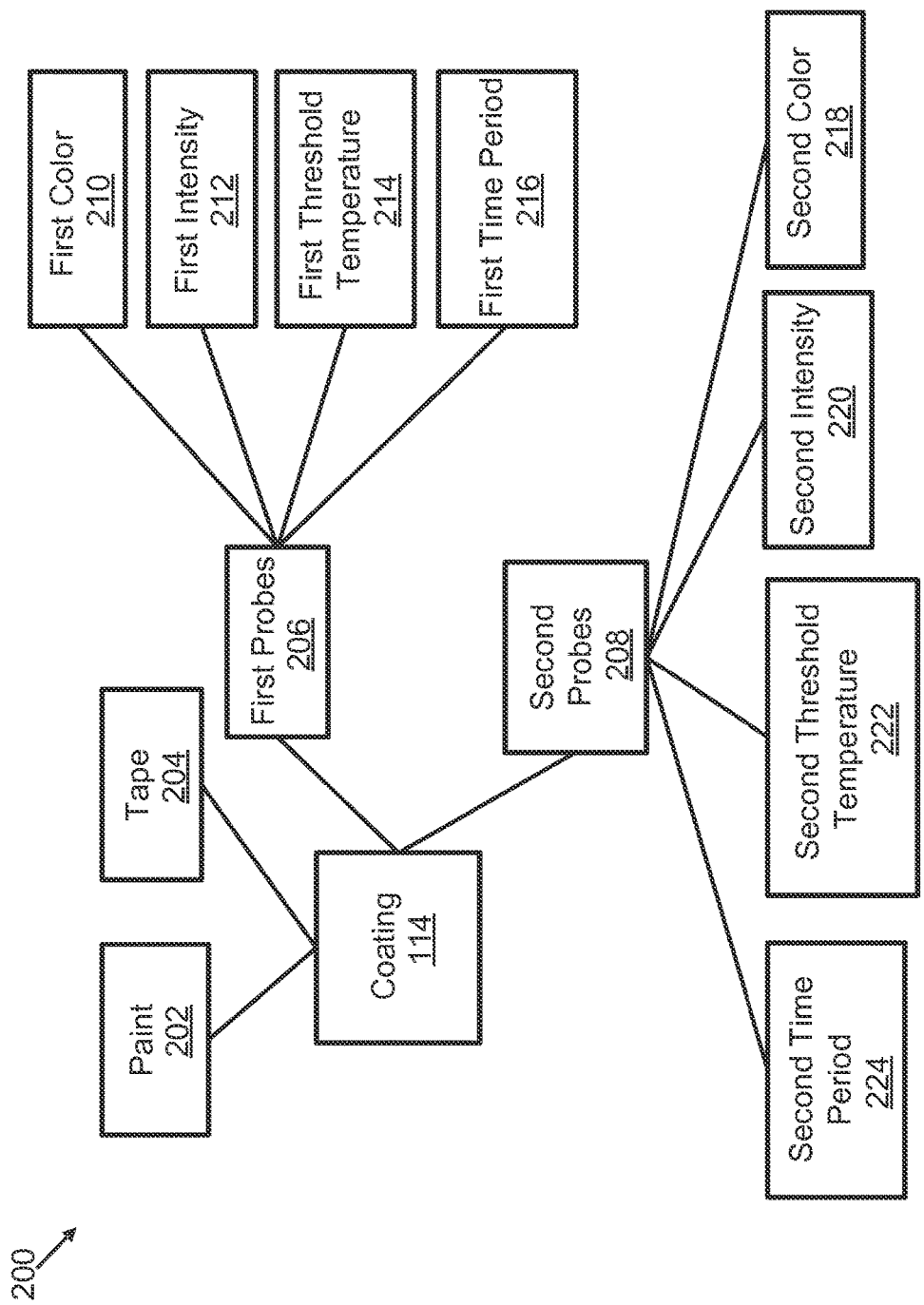
FIG. 2 is a block diagram of components of an example thermochromatic coating used in monitoring temperatures of the battery of FIG. 1.

FIG. 2 is a block diagram of components 200 of first thermochromatic coating 114. In at least some implementations, second thermochromatic coating 116, third thermochromatic coating 118, and fourth thermochromatic coating 120 are the same or substantially the same materials. First thermochromatic coating 114 includes a thermochromatic paint 202 and/or a thermochromatic tape 204. Additionally, first thermochromatic coating 114 includes first probes 206 that are configured to fluoresce with a first color 210 and first intensity 212 when first probes 206 exceed a first threshold temperature 214 and are exposed to a predefined frequency of electromagnetic radiation. First probes 206 remain configured to fluoresce at the first color 210 and first intensity 212, when exposed to the predefined frequency of electromagnetic radiation, within a first time period 216 (e.g., four hours) after exceeding the first threshold temperature 214. In other words, first probes 206 have a memory of temperatures experienced by first probes 206. In some implementations, first color 210 is a range of colors, first intensity 212 is a range of intensities and first threshold temperature 214 is a range of temperatures corresponding to the ranges of colors and intensities.

In some implementations, first thermochromatic coating 114 includes second probes 208 that are configured to fluoresce with a second color 218 and second intensity 220 when second probes 208 exceed a second threshold temperature 222 and are exposed to a predefined frequency of electromagnetic radiation. In at least some implementations, one or more of second color 218, second intensity 220, second threshold temperature 222, and/or second time period 224 are different than first color 210, first intensity 212, first threshold temperature 214, and/or first time period 216. Second probes 208 remain configured to fluoresce at the second color 218 and second intensity 220, when exposed to the predefined frequency of electromagnetic radiation, within a second time period 224 (e.g., four hours) after exceeding the second threshold temperature 222. In some implementations, second color 218 is a range of colors, second intensity 220 is a range of intensities and second threshold temperature 222 is a range of temperatures corresponding to the ranges of colors and intensities.

Figure 3:
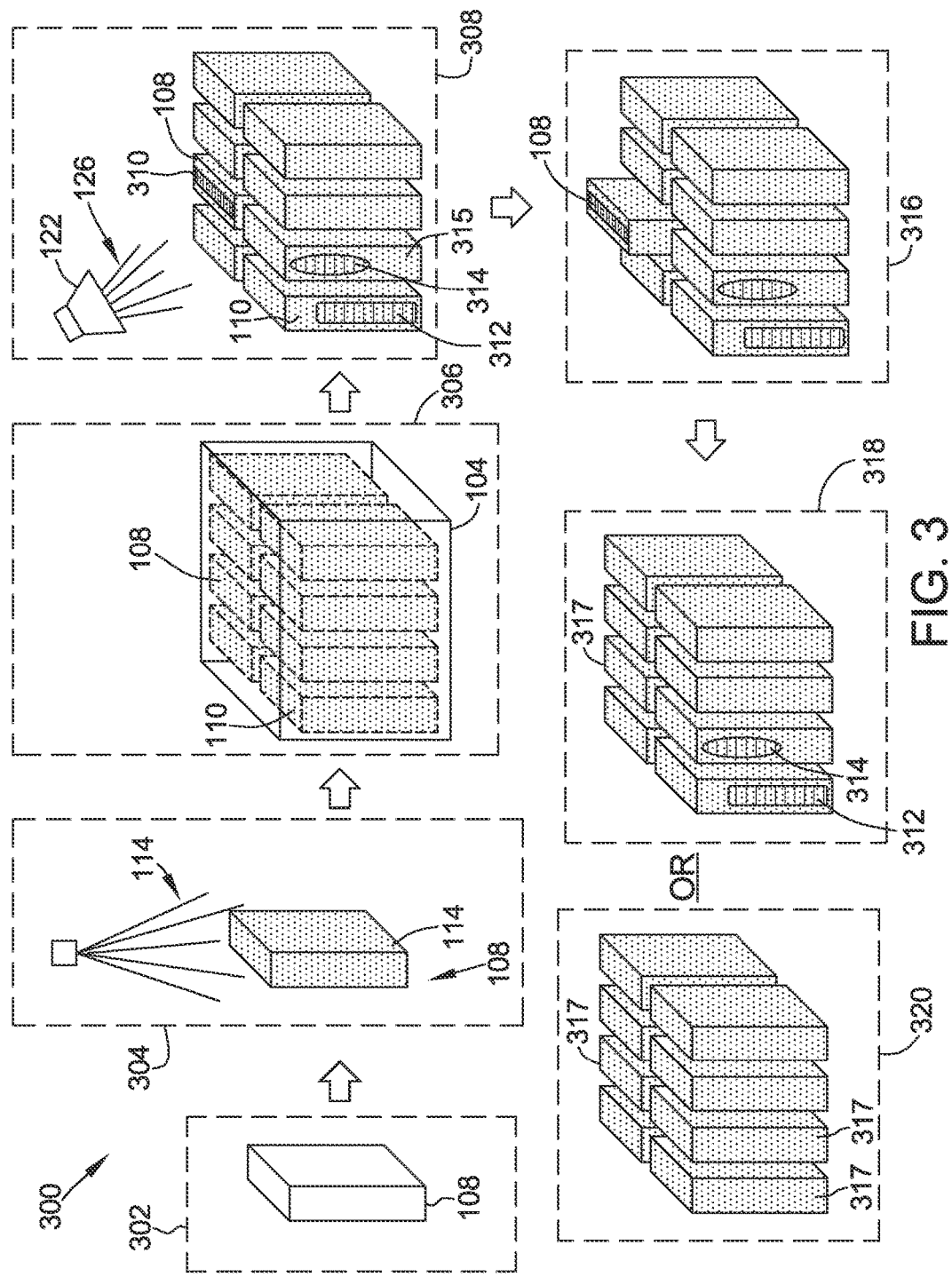
FIG. 3 is a diagram of a process for monitoring temperatures of cells within the battery of FIG. 1.

FIG. 3 is a diagram of a process 300 for monitoring temperatures of cells within battery 104. Initially, first cell 108 is generated 302 for assembly into battery 104. Additionally, first cell 108 is coated 304 (e.g., painted or taped) with first thermochromatic coating 114. Additionally, first cell 108 is assembled 306 in battery 104 with other cells, including second cell 110, that have been similarly coated. Further, during periodic maintenance or a heating condition, for example a heating condition indicated by a thermocouple (not shown), the cells of battery 104 are exposed 308 to the predefined frequency 128 of electromagnetic radiation 126 (e.g., ultraviolet light) by emitter device 122, and the thermochromatic responses 134 of the cells, including first cell 108 and second cell 110, are checked for colors 210 and/or intensities 212 associated with temperatures above predefined threshold temperatures (e.g., first threshold temperature 214 and/or second threshold temperature 222). A first portion 310, of first cell 108 is above first threshold temperature 214. A second portion 312 of second cell 110 and a third portion 314 of a third cell 315 are above second threshold temperature 222, which is less than first threshold temperature 214. First cell 108 is removed 316 and replaced 318 with a replacement cell 317. Second cell 110 and third cell 315 are monitored more frequently than other cells in battery 104, given that second portion 312 and third portion 314 were above the second threshold temperature 222. In other implementations, second cell 110 and third cell 315 are also replaced 320 with replacement cells 317.

Figure 4:
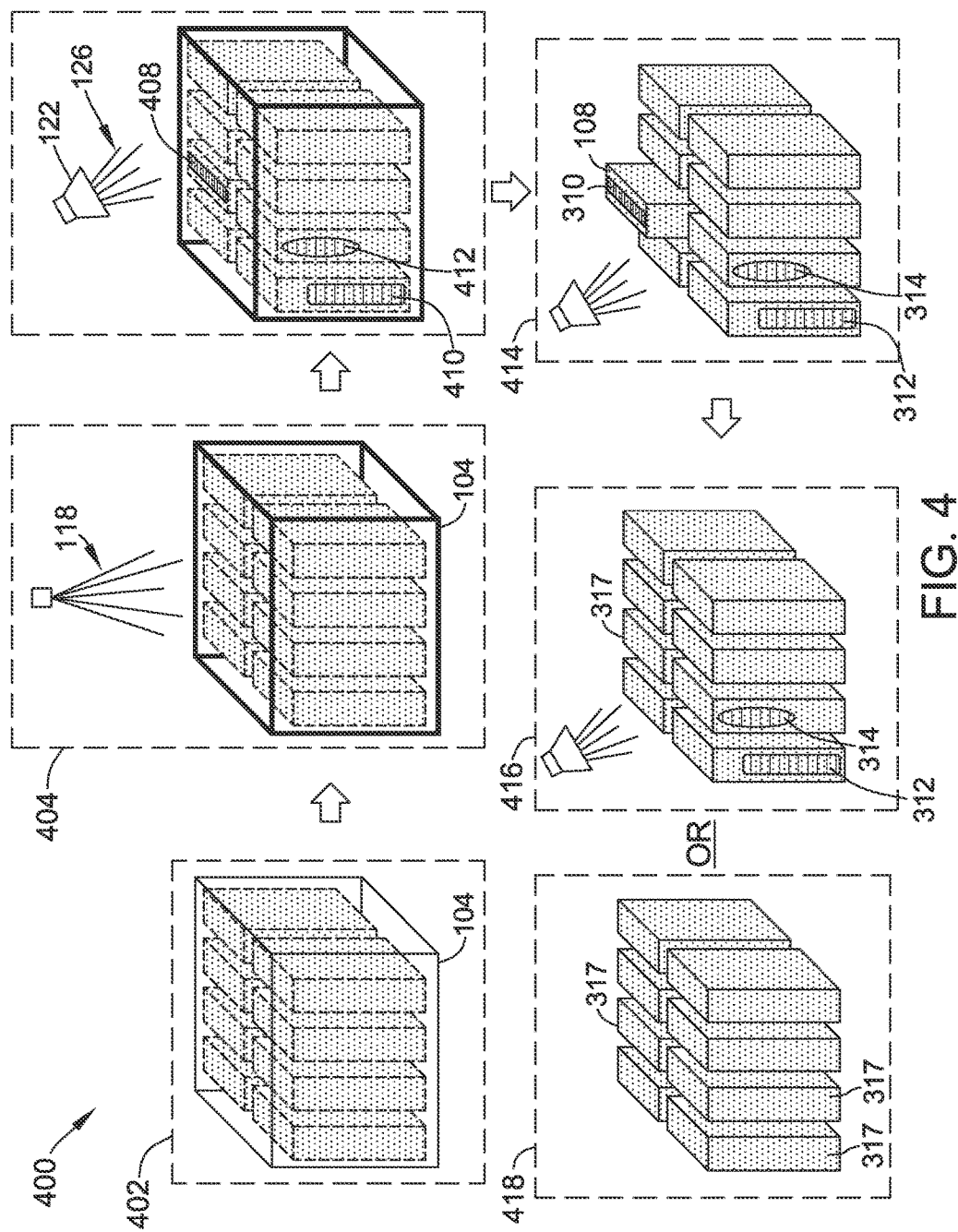
FIG. 4 is a diagram of a process for monitoring temperatures of the battery of FIG. 1.

FIG. 4 is a diagram of a process 400 for monitoring temperatures of battery 104. Initially, thermochromatic covered cells are assembled 402 into battery 104, for example as described with reference to process 300. Additionally, battery 104 is coated 404 (e.g., painted or taped) with third thermochromatic coating 118. Additionally, during periodic maintenance, battery 104 is exposed 406 to the predefined frequency 128 of electromagnetic radiation 126 (e.g., ultraviolet light) by emitter device 122, and the thermochromatic response 134 of third thermochromatic coating 118 is checked for colors 210 and/or intensities 212 associated with temperatures above predefined threshold temperatures (e.g., first threshold temperature 214 and/or second threshold temperature 222). Colors and intensities on third thermochromatic 118 coating indicate temperatures of cells within battery 104. A first portion 408 is above first threshold temperature 214. A second portion 410 and a third portion 412 are above second threshold temperature 222, which is less than first threshold temperature 214. First portion 408 corresponds to first portion 310 of first cell 108, second portion 410 corresponds to second portion of second cell 110, and third portion 412 corresponds to third portion 314 of third cell 315. First cell 108 is removed 414 and replaced 416 with a replacement cell 317. Second cell 110 and third cell 315 are monitored more frequently than other cells in battery 104, given that second portion 312 and third portion 314 were above the second threshold temperature 222. In other implementations, second cell 110 and third cell 315 are also replaced 320 with replacement cells 317.

Figure 5:
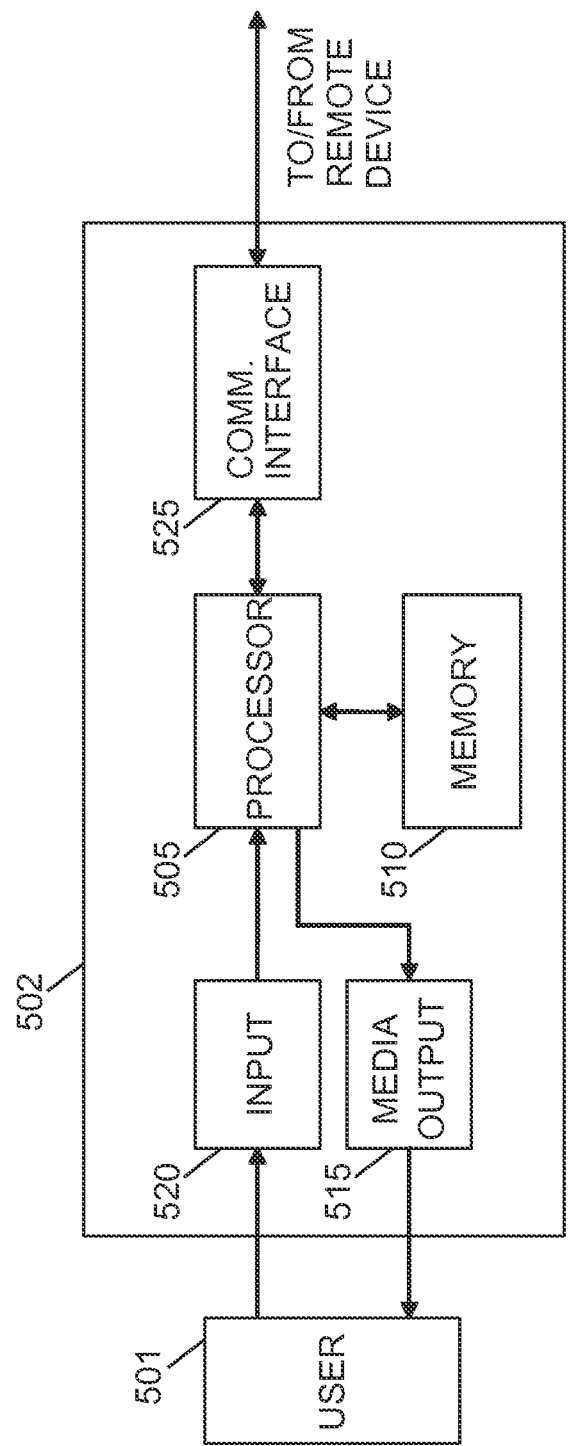
FIG. 5 is a block diagram of an example computing device used in the environment of FIG. 1.

FIG. 5 is a block diagram of an example computing device 502. Computing device 502 is representative of monitoring computing device 144, imaging device 130, and emitter device 122. More specifically, monitoring computing device 144, imaging device 130, and emitter device 122 include one or more components of computing device 502. Computing device 502 includes at least one processor 505 for executing instructions. In some implementations, executable instructions are stored in a memory device 510. Processor 505 may include one or more processing units (e.g., in a multi-core configuration). One or more memory devices 510 are any one or more devices allowing information such as executable instructions and/or other data to be stored and retrieved. One or more memory devices 510 may include one or more computer-readable media.

Computing device 502 also includes at least one media output component 515 for presenting information to a user 501. Media output component 515 is any component capable of conveying information to user 501. In some implementations, media output component 515 includes an output adapter such as a video adapter and/or an audio adapter. An output adapter is operatively coupled to processor 505 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones). In at least some implementations, media output component 515 causes one or more of history 146, patterns 154, causes 156, indications 158, and recommendations 160 to be displayed to user 501.

In some implementations, computing device 502 includes an input device 520 for receiving input from user 501. Input device 520 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 515 and input device 520.

Computing device 502 additionally includes a communication interface 525, which is communicatively couplable to a remote device such as another computing device 502. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in one or more memory devices 510 are, for example, computer-readable instructions for providing a user interface to user 501 via media output component 515 and, optionally, receiving and processing input from input device 520. A user interface may include, text, graphics, and/or sound that enable user 501 to interact with computing device 502.

Figure 6:
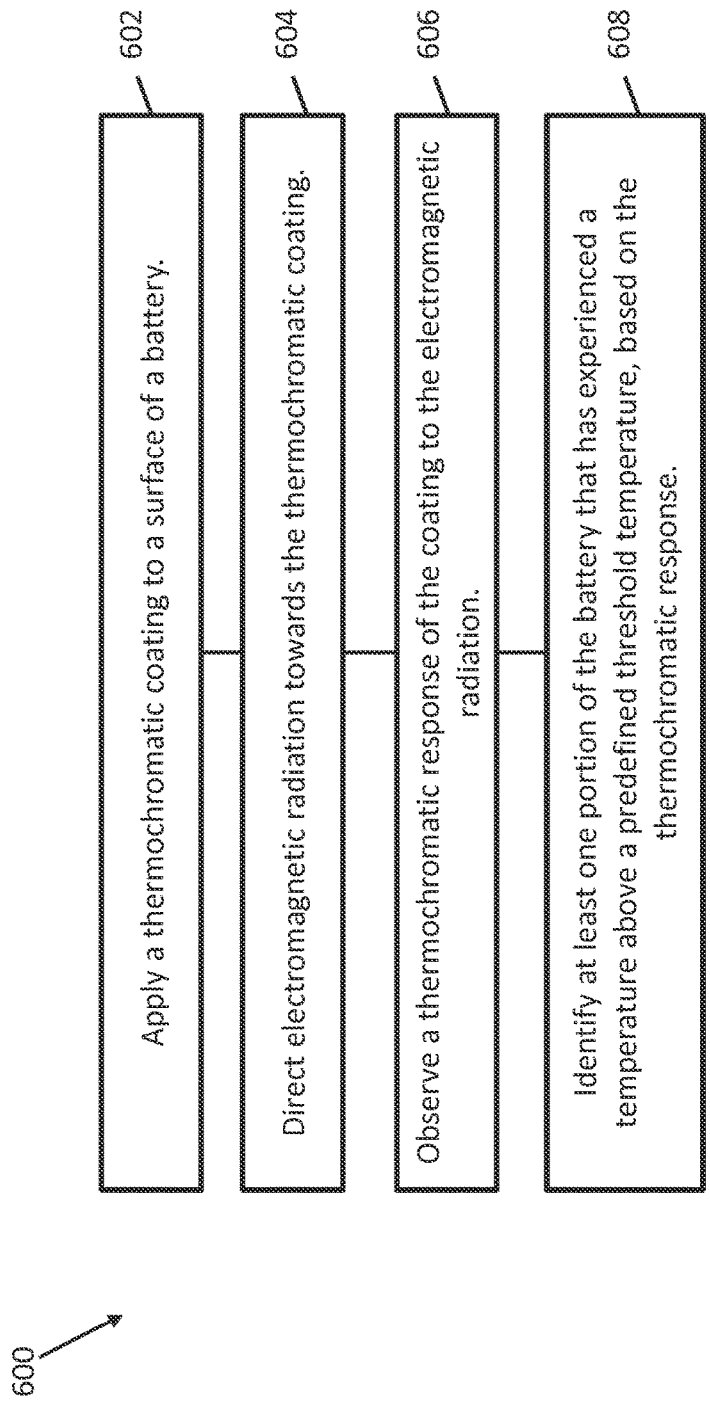
FIG. 6 is a diagram of an example process for monitoring temperatures of an object.

FIG. 6 is a diagram of a process 600 for monitoring temperatures of a battery 104. Initially, process 600 includes applying 602 a thermochromatic coating (e.g., third thermochromatic coating 118) to a surface of a battery (e.g., battery 104). Additionally, process 600 includes directing 604 electromagnetic radiation (e.g., electromagnetic radiation 126) towards the thermochromatic coating (e.g., third thermochromatic coating 118). Additionally, process 600 includes observing 606 a thermochromatic response (e.g., thermochromatic response 134) of the thermochromatic coating (e.g., third thermochromatic coating 118) to the electromagnetic radiation (e.g., electromagnetic radiation 126). Additionally, process 600 includes identifying 608 at least one portion (e.g., first portion 310, second portion 312, and/or third portion 314) of the battery 104 that has experienced a temperature above a predefined threshold temperature (e.g., first threshold temperature 214 and/or second threshold temperature 222), based on the thermochromatic response.

In some implementations, applying the thermochromatic coating further includes applying a thermochromatic coating (e.g., first thermochromatic coating 114, second thermochromatic coating 116, third thermochromatic coating 118, and/or fourth thermochromatic coating 120) to the surface of at least one of a battery container (e.g., container 112) and a cell (e.g., first cell 108 and/or second cell 110) of the battery (e.g., battery 104). In some implementations, applying the thermochromatic coating (e.g., first thermochromatic coating 114, second thermochromatic coating 116, third thermochromatic coating 118, and/or fourth thermochromatic coating 120) includes applying at least one of a thermochromatic paint (e.g., thermochromatic paint 202) and a thermochromatic tape (e.g., thermochromatic tape 204) to the surface of the battery 104.

In some implementations, applying the thermochromatic coating (e.g., first thermochromatic coating 114, second thermochromatic coating 116, third thermochromatic coating 118, and/or fourth thermochromatic coating 120) includes applying a thermochromatic coating (e.g., first thermochromatic coating 114, second thermochromatic coating 116, third thermochromatic coating 118, and/or fourth thermochromatic coating 120) that includes first probes (e.g., first probes 206) that fluoresce in association with a first threshold temperature (e.g., first threshold temperature 214) and second probes (e.g., second probes 208) that fluoresce in association with a second threshold temperature (e.g., second threshold temperature 222) that is different from the first threshold temperature (e.g., first threshold temperature 214). In some implementations, directing electromagnetic radiation (e.g., electromagnetic radiation 126) further includes directing ultraviolet light towards the thermochromatic coating (e.g., first thermochromatic coating 114, second thermochromatic coating 116, third thermochromatic coating 118, and/or fourth thermochromatic coating 120). In some implementations, observing the thermochromatic response (e.g., thermochromatic response 134) further includes generating an image (e.g., image 142) of the surface using an imaging device (e.g., imaging device 130). In some implementations, process 600 additionally includes storing a plurality of images (e.g., images 142) of the surface over a time period and identifying a heating pattern (e.g., pattern 154) in the stored plurality of images (e.g., images 142).

In some implementations, observing the thermochromatic response further includes detecting a change in a color (e.g., first color 210) or an intensity (e.g., first intensity 212) of the thermochromatic response (e.g., thermochromatic response 134). In some implementations, process 600 additionally includes determining that the portion (e.g., first portion 310) of the battery experienced a temperature above a predefined threshold temperature (e.g., first threshold temperature 214) and replacing at least the portion of the battery (e.g., replacing first cell 108) in response to the determination. In some implementations, process 600 includes installing the battery in an aircraft (e.g., aircraft 102).

Figure 7:
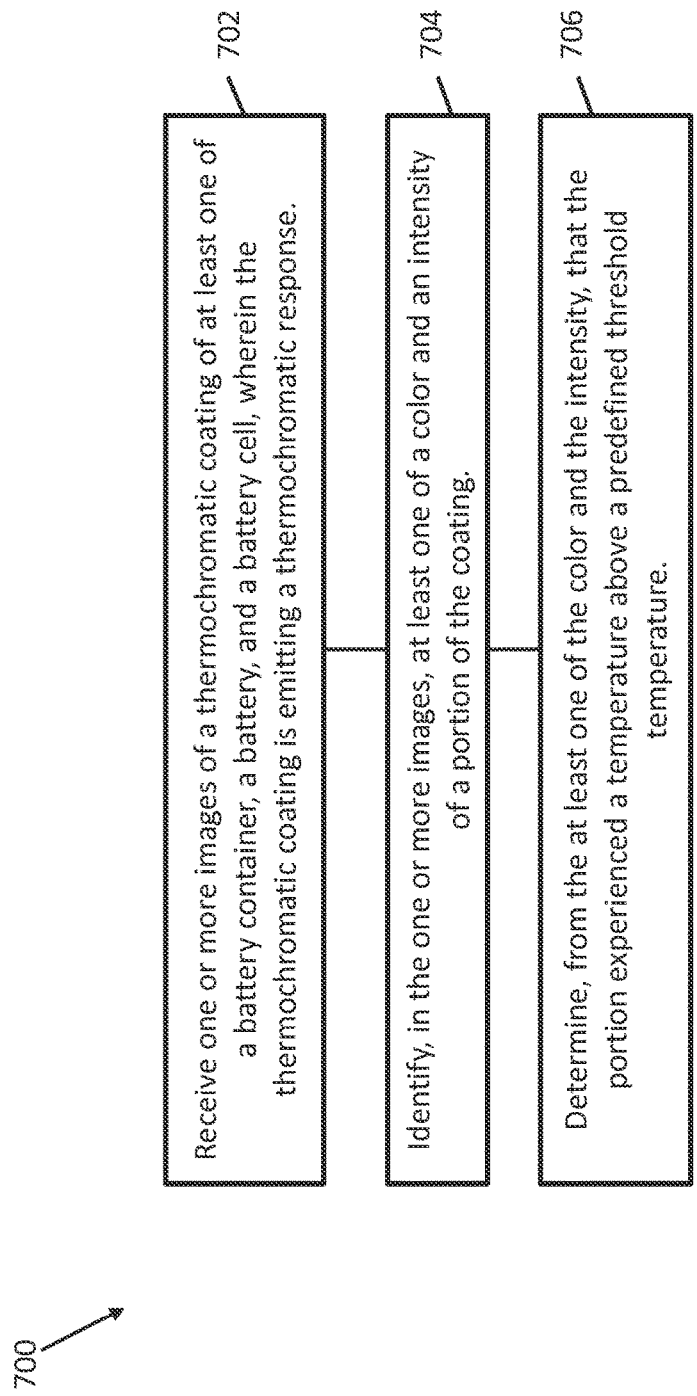
FIG. 7 is a diagram of an example process performed by a monitoring computing device for monitoring temperatures of the battery of FIG. 1.

FIG. 7 is a diagram of an example process 700 performed by monitoring computing device 144 for monitoring temperatures of battery 104. Initially, monitoring computing device 144 receives 702 one or more images (e.g., images 142) of a thermochromatic coating (e.g., first thermochromatic coating 114, second thermochromatic coating 116, third thermochromatic coating 118, and/or fourth thermochromatic coating 120) of at least one of a battery container (e.g., container 112), a battery (e.g., battery 104), and a battery cell (e.g., first cell 108 and/or second cell 110), wherein the thermochromatic coating (e.g., first thermochromatic coating 114, second thermochromatic coating 116, third thermochromatic coating 118, and/or fourth thermochromatic coating 120) is emitting a thermochromatic response (e.g., thermochromatic response 134). Additionally, monitoring computing device 144 identifies 704, in the one or more images (e.g., images 142), at least one of a color (e.g., first color 210) and an intensity (e.g., first intensity 212) of a portion (e.g., first portion 310) of the thermochromatic coating. Additionally, monitoring computing device 144 determines 706, from the at least one of the color (e.g., first color 210) and the intensity (e.g., first intensity 212), that the portion (e.g., first portion 310) experienced a temperature above a predefined threshold temperature (e.g., first threshold temperature 214).

In some implementations, monitoring computing device 144 is further configured to generate a heating history (e.g., history 146) based at least in part on the one or more images (e.g., images 142). In some implementations, monitoring computing device 144 is further configured to identify at least one pattern (e.g., patterns 154) in the heating history (e.g., history 146). In some implementations, monitoring computing device 144 is further configured to display the one or more images using an output device (e.g., using media output component 515) and visually identify (e.g., indications 158) in the one or more images that the portion experienced a temperature above a predefined threshold temperature.

In some implementations, monitoring computing device 144 is further configured to generate a recommendation (e.g., recommendations 160) to replace the portion (e.g., first cell 108) in response to determining that the portion experienced the temperature above the predefined threshold temperature (e.g., first threshold temperature 214).

A technical effect of systems and methods described herein includes at least one of: (a) applying a thermochromatic coating to a surface of a battery; (b) directing electromagnetic radiation towards the thermochromatic coating; (c) observing a thermochromatic response of the coating to the electromagnetic radiation; (d) identifying at least one portion of the battery that has experienced a temperature above a predefined threshold temperature, based on the thermochromatic response; (e) receiving one or more images of a thermochromatic coating of at least one of a battery container, a battery, and a battery cell, wherein the thermochromatic coating is emitting a thermochromatic response; (f) identifying, in the one or more images, at least one of a color and an intensity of a portion of the thermochromatic coating; and (g) determining, from the at least one of the color and the intensity, that the portion experienced a temperature above a predefined threshold temperature.

As compared to known methods and systems for measuring temperatures of a battery, the methods and systems described herein provide a direct and clear indicator of the locations, extents, and levels of heating that have occurred in the past as well as the present for the entire surface of a battery.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for monitoring a temperature of a battery, the method comprising:
    disposing a battery having a first cell and a second cell within a container;
    applying a first thermochromatic coating to the first cell;
    applying a second thermochromatic coating to the second cell;
    applying a third thermochromatic coating to the battery;
    applying a fourth thermochromatic coating to the container;
    directing electromagnetic radiation towards the first thermochromatic coating, the second thermochromatic coating, the third thermochromatic coating, and the fourth thermochromatic coating;
    observing a thermochromatic response emitted by the first thermochromatic coating, the second thermochromatic coating, the third thermochromatic coating, and the fourth thermochromatic coating; and
    identifying at least one portion of the battery that has experienced temperatures exceeding a predefined threshold temperature and amount of time at temperatures exceeding the predefined threshold temperature based on the thermochromatic response.

2. The method of claim 1, wherein the applying the first, second, third, and fourth thermochromatic coatings further comprises applying a thermochromatic paint and a thermochromatic tape.

3. The method of claim 1, wherein the directing the electromagnetic radiation further comprises directing ultraviolet light towards the first, second, third, and fourth thermochromatic coatings.

4. The method of claim 1, wherein the observing the thermochromatic response further comprises generating one or more images of the first cell, the second cell, the battery, and the container using an imaging device.

5. The method of claim 1, further comprising:
    storing a plurality of images of the first cell, the second cell, the battery, and the container obtained over a time period; and
    identifying a heating pattern in the stored plurality of images.

6. The method of claim 1, wherein the observing the thermochromatic response further comprises detecting a change in a color or an intensity of the thermochromatic response.

7. The method of claim 1, further comprising:
    determining the amount of time of at least one of the first cell, the second cell, the battery, or the container above the predefined threshold temperature; and
    replacing the at least one of the first cell, the second cell, the battery, or the container in response to the determining.

8. The method of claim 1, further comprising installing the battery in an aircraft.

9. The method of claim 1, wherein the applying the first thermochromatic coating to the first cell comprises coating an entire outer surface of the first cell with the first thermochromatic coating, wherein the applying the second thermochromatic coating to the second cell comprises coating an entire outer surface of the second cell with the second thermochromatic coating, wherein the applying the third thermochromatic coating to the battery comprises coating an entire outer surface of the battery with the third thermochromatic coating, and wherein the applying the fourth thermochromatic coating to the container comprises coating an entire outer surface of the container with the fourth thermochromatic coating.

10. The method of claim 1, wherein each of the first thermochromatic coating, the second thermochromatic coating, the third thermochromatic coating, and the fourth thermochromatic coating includes a plurality of probes configured to emit the thermochromatic response in response to exposure to a frequency range of the electromagnetic radiation, the thermochromatic response indicative of an amount of time at temperatures exceeding the predefined threshold temperature, the predefined threshold temperature comprising a minimum temperature at which the plurality of probes are activated.

11. The method of claim 1, wherein the applying the first thermochromatic comprises applying the first thermochromatic coating that includes first probes configured to activate at a first threshold temperature, wherein the applying the second thermochromatic comprises applying the second thermochromatic coating that includes second probes configured to activate at the first threshold temperature or a second threshold temperature that is different from the first threshold temperature, wherein the applying the third thermochromatic coating comprises applying the third thermochromatic coating that includes third probes configured to activate at a third threshold temperature that is different from the first threshold temperature and the second threshold temperature, and wherein the applying the fourth thermochromatic coating to the container comprises applying the fourth thermochromatic coating that includes fourth probes configured to activate at a fourth threshold temperature that activate at a fourth threshold temperature that is different from the first, second, and third threshold temperatures.

12. The method of claim 1, wherein the first thermochromatic coating fluoresces in response to exposure to a first frequency range of electromagnetic radiation, wherein the second thermochromatic coating fluoresces in response to exposure to a second frequency range of electromagnetic radiation, wherein the third thermochromatic coating fluoresces in response to exposure to a third frequency range of electromagnetic radiation that differs from at least one of the first and second frequency ranges of electromagnetic radiation, and wherein the fourth thermochromatic coating fluoresces in response to a fourth frequency range of electromagnetic radiation that differs from at least one of the first, second, and third frequency ranges of electromagnetic radiation.

13. A method for monitoring a temperature of a battery having a first cell and a second cell, the battery contained within a battery container, the method comprising:
   applying a first thermochromatic coating to a surface of the battery container, wherein the first thermochromatic coating includes a plurality of first probes configured to emit a first thermochromatic response when exposed to a predefined frequency range of electromagnetic radiation within a predefined time period after exceeding a first predefined threshold temperature;
   applying a second thermochromatic coating to an entire outer surface of the first cell, wherein the second thermochromatic coating includes a plurality of second probes configured to emit a second thermochromatic response when exposed to the predefined frequency range of electromagnetic radiation within a predefined time period after exceeding a second predefined threshold temperature;
   applying a third thermochromatic coating to an entire outer surface of the second cell, wherein the third thermochromatic coating includes a plurality of third probes configured to emit a third thermochromatic response when exposed to the predefined frequency range of electromagnetic radiation within a predefined time period after exceeding a third predefined threshold temperature;
   applying a fourth thermochromatic coating to an entire outer surface of the battery, wherein the fourth thermochromatic coating includes a plurality of fourth probes configured to emit a fourth thermochromatic response when exposed to the predefined frequency range of electromagnetic radiation within a predefined time period after exceeding a fourth predefined threshold temperature;
   directing the electromagnetic radiation towards the first thermochromatic coating, the second thermochromatic coating, the third thermochromatic coating, and the fourth thermochromatic coating;
   observing the first thermochromatic response and identifying at least one portion of the battery container that has experienced a temperature above the first predefined threshold temperature within the predefined time period, based on the first thermochromatic response;
   observing the second thermochromatic response and identifying at least one portion of the first cell that has experienced a temperature above the second predefined threshold temperature within the predefined time period, based on the second thermochromatic response;
   observing the third thermochromatic response and identifying at least one portion of the second cell that has experienced a temperature above the third predefined threshold temperature within the predefined time period, based on the third thermochromatic response; and
   observing the fourth thermochromatic response and identifying at least one portion of the battery that has experienced a temperature above the fourth predefined threshold temperature within the predefined time period, based on the fourth thermochromatic response.

14. The method of claim 13, wherein the directing the electromagnetic radiation further comprises directing ultraviolet light towards the first, second, third, and fourth thermochromatic coatings.

15. The method of claim 13, wherein the observing the first, second, third, and fourth thermochromatic responses further comprises generating at least one image of at least one of the surface of battery container, at least a portion of the entire outer surface of the first cell, at least a portion of the entire outer surface of the second cell, and the entire outer surface of the battery using an imaging device.

16. A system for use in monitoring temperatures experienced by a battery, said system comprising:
   a battery including a first cell and a second cell;
   a container containing the battery;
   a first thermochromatic coating applied to the first cell;
   a second thermochromatic coating applied to the second cell;
   a third thermochromatic coating applied to battery; and
   a fourth thermochromatic coating applied to the container.

17. The system of claim 16, wherein the first, second, third, and fourth thermochromatic coatings include a plurality of probes that, in response to electromagnetic radiation of a predefined frequency range, emit a thermochromatic response indicative of an amount of time at a temperature exceeding a predefined threshold temperature, the predefined threshold temperature comprising a minimum temperature at which each respective probe is activated.

18. The system of claim 17, wherein the plurality of probes include first probes configured to activate at a first threshold temperature and to emit a first thermochromatic response in response to electromagnetic radiation of a first frequency and second probes configured to activate at a second threshold temperature and to emit a second thermochromatic response in response to electromagnetic radiation of a second frequency, wherein the first frequency is different from the second frequency, the first thermochromatic response is different from the second thermochromatic response and the first threshold temperature is different from the second threshold temperature.

19. The system of claim 17, wherein the first, second, third, and fourth thermochromatic coatings include a thermochromatic paint and a thermochromatic tape.

20. The system of claim 16, wherein the battery is installed in an aircraft.

21. The system of claim 16, wherein the battery is a lithium ion battery.

22. A system for monitoring temperatures experienced by a battery, the system comprising:
   a monitoring computing device including a processor, the monitoring computing device configured to:
      receive one or more images of thermochromatic coatings of a battery container, a battery, a first cell of the battery, and a second cell of the battery, wherein the thermochromatic coatings emit a thermochromatic response in response to electromagnetic radiation of a predefined frequency range, the thermochromatic response indicative of an amount of time at a temperature exceeding a threshold temperature;

identify, in the one or more images, at least one of a color and an intensity of the thermochromatic response emitted by the thermochromatic coatings; and determine, from the at least one of the color and the intensity, the amount of time at a temperature exceeding the threshold temperature at the thermochromatic coatings.

23. The system of claim 22, wherein the monitoring computing device is further configured to generate a heating history based at least in part on the one or more images.

24. The system of claim 23, wherein the monitoring computing device is further configured to identify at least one pattern in the heating history.

25. The system of claim 22, wherein the monitoring computing device is further configured to:

display the one or more images using an output device; and visually identify in the one or more images that one or more portions of the thermochromatic coatings experienced a temperature above a predefined threshold temperature within the predefined time period.

26. The system of claim 22, wherein the monitoring computing device is further configured to generate a recommendation to replace one or more portions of the thermochromatic coatings in response to determining the amount of time at the temperature exceeding the threshold temperature at the one or more portions.

* * * * *